US007954752B2

(12) United States Patent
Smith et al.

(10) Patent No.: US 7,954,752 B2
(45) Date of Patent: Jun. 7, 2011

(54) CRASH ATTENUATION SYSTEM FOR AIRCRAFT

(75) Inventors: Michael R. Smith, Colleyville, TX (US); Somen Chowdhury, Kirkland (CA); Cheng-Ho Tho, Arlingotn, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 436 days.

(21) Appl. No.: 12/089,884

(22) PCT Filed: Nov. 8, 2006

(86) PCT No.: PCT/US2006/043706
§ 371 (c)(1),
(2), (4) Date: Apr. 10, 2008

(87) PCT Pub. No.: WO2008/054401
PCT Pub. Date: May 8, 2008

(65) Prior Publication Data
US 2010/0044507 A1 Feb. 25, 2010

(51) Int. Cl.
*B64C 25/56* (2006.01)
*B64D 25/18* (2006.01)
(52) U.S. Cl. .............. 244/17.17; 244/100 A; 244/107; 244/139
(58) Field of Classification Search ............ 244/17.17, 244/139, 121, 100 A, 107; 441/125
See application file for complete search history.

(56) References Cited

U.S. PATENT DOCUMENTS

| | | | | |
|---|---|---|---|---|
| 2,131,528 A | * | 9/1938 | Soyer | 244/107 |
| 3,602,661 A | * | 8/1971 | Liedberg | 200/61.05 |
| 3,603,535 A | * | 9/1971 | DePolo | 244/121 |
| 3,727,716 A | * | 4/1973 | Jenkins | 244/100 A |
| 3,738,597 A | * | 6/1973 | Earl et al. | 244/100 A |
| 3,964,698 A | * | 6/1976 | Earl | 244/100 A |
| 3,981,462 A | * | 9/1976 | Berezhnoi et al. | 244/100 A |

(Continued)

FOREIGN PATENT DOCUMENTS
DE 4118300 A1 12/1992
(Continued)

OTHER PUBLICATIONS

"CABS Cockpit Air Bag System," Armor Holdings Aerospace & Defense Group, Jan. 2006.
Akif Bolukbasi, "Active Crash Protection Systems for UAVs," American Helicopter Society Annual Forum 63 Proceedings, Virginia Beach, VA, May 1-3, 2007.

(Continued)

*Primary Examiner* — Galen Barefoot
(74) *Attorney, Agent, or Firm* — James E. Walton

(57) ABSTRACT

A crash attenuation system for an aircraft, the system having an airbag carried by the aircraft and inflatable generally adjacent an exterior of the aircraft. The airbag has at least one vent for releasing gas from the interior of the airbag. A first gas source is in fluid communication with the interior of the airbag for inflating the airbag with gas generated provided by the first gas source. A vent valve is provided for controlling a flow of gas through each vent, each vent valve being selectively configurable between an open state, in which gas can pass through the associated vent from the interior of the airbag, and a closed state, in which gas is retained within the interior of the airbag. A second gas source is provided for at least partially re-inflating the airbag after venting of gas through the at least one vent.

9 Claims, 8 Drawing Sheets

U.S. PATENT DOCUMENTS

| | | | |
|---|---|---|---|
| 3,990,658 A | | 11/1976 | Letsinger |
| 4,004,761 A | | 1/1977 | McAvoy |
| 4,032,088 A | | 6/1977 | McAvoy |
| 4,657,516 A | * | 4/1987 | Tassy .................. 441/125 |
| 5,259,574 A | * | 11/1993 | Carrot .................. 244/100 A |
| 5,356,097 A | * | 10/1994 | Chalupa .................. 244/100 A |
| 5,407,150 A | | 4/1995 | Sadleir |
| 5,560,568 A | | 10/1996 | Schmittle |
| 5,765,778 A | | 6/1998 | Otsuka |
| 5,836,544 A | | 11/1998 | Gentile |
| 5,992,794 A | * | 11/1999 | Rotman et al. ............. 244/17.17 |
| 6,070,546 A | | 6/2000 | Downey et al. |
| 6,227,325 B1 | * | 5/2001 | Shah .................. 180/274 |
| 6,273,463 B1 | | 8/2001 | Peterson et al. |
| 6,338,456 B1 | | 1/2002 | Cairo-Iocco et al. |
| 6,439,256 B2 | | 8/2002 | Koelsch et al. |
| 6,648,371 B2 | | 11/2003 | Vendely et al. |
| 6,820,898 B2 | | 11/2004 | Dinsdale et al. |
| 6,886,776 B2 | | 5/2005 | Wagner et al. |
| 7,232,001 B2 | | 6/2007 | Hakki et al. |
| 2003/0062443 A1 | | 4/2003 | Wagner et al. |

FOREIGN PATENT DOCUMENTS

| | | |
|---|---|---|
| EP | 1403180 A2 | 3/2004 |
| JP | 5322496 A | 12/1993 |
| JP | 8192797 | 7/1996 |
| JP | 11268605 A | 10/1999 |

OTHER PUBLICATIONS

Akif Bolukbasi, "Active Crash Protection Systems for Rotorcraft," Center for Rotorcraft Innovation/National Rotorcraft Technology Center Program 2007 Year End Review, Phoenix, AZ, Feb. 19-20, 2008.

REAPS Rotorcraft Protection, Brochure by Rafael Armament Development Authority, Ltd., Ordnance Systems Division, Haifa, Israel.

Kevin Coyne, F-111 Crew Module Escape and Survival Systems, pp. 1-10, http://www.f-111.net/ejection.htm.

Specification for PCT/US09/51821 filed on Jul. 27, 2009.

Response to Invitation to Correct Defects for PCT/US09/51821 dated Sep. 16, 2009.

International Search Report for PCT/US09/51821 dated Sep. 11, 2009.

Specification for PCT/US07/82140 filed on Oct. 22, 2007.

International Search Report for PCT/US07/82140 dated Apr. 18, 2008.

Article 34 Amendments for PCT/US07/82140 filed on Aug. 18, 2008.

International Publication of PCT/US07/82140 published on Apr. 30, 2009.

Article 34 Amendments for PCT/US07/82140 filed on Oct. 13, 2009.

Office Action from Corresponding Canadian Application No. 2,628,380, dated Dec. 23, 2009.

Rejection Notice for Japanese Application No. 2008-542336, dated Feb. 23, 2011, 1 page.

* cited by examiner

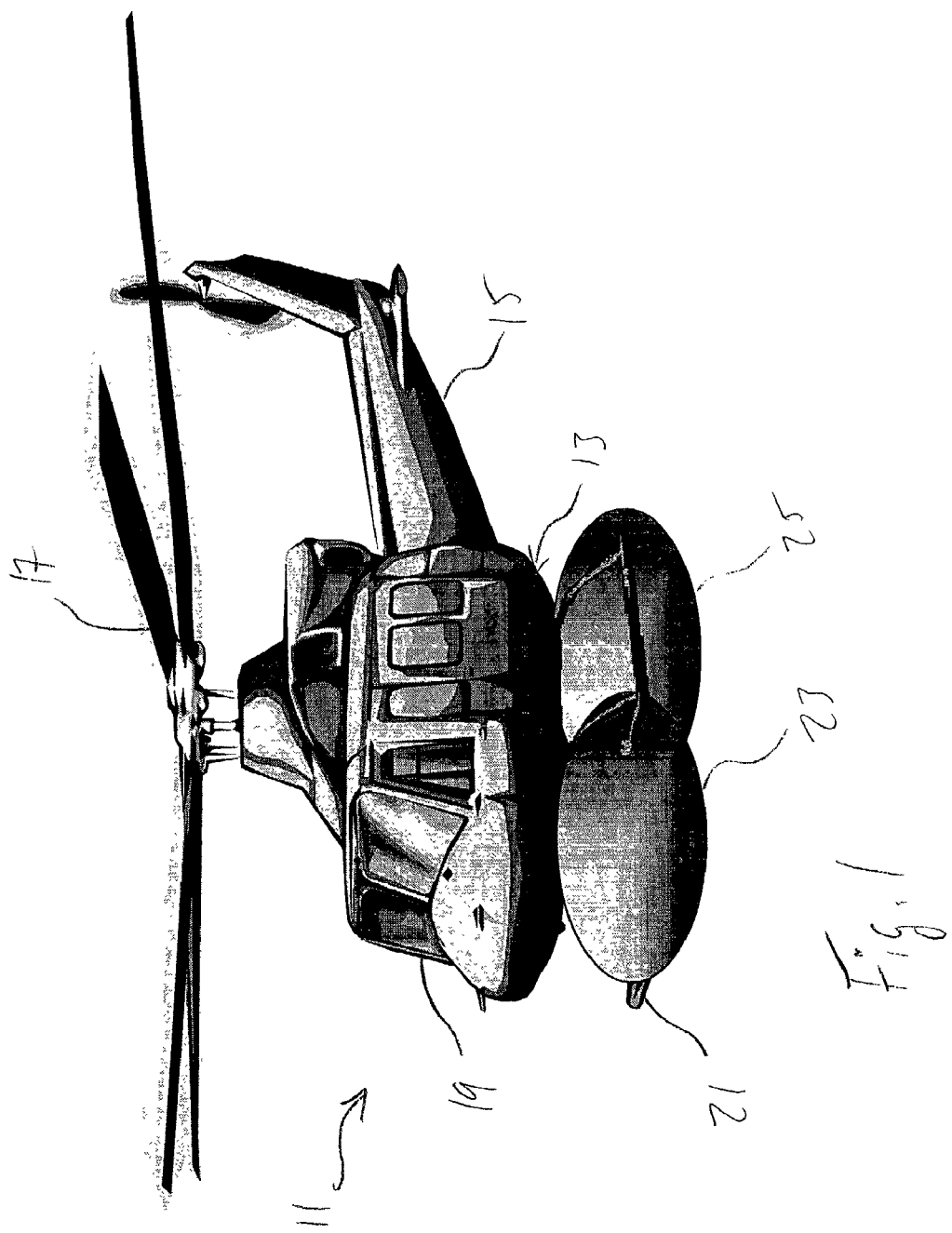

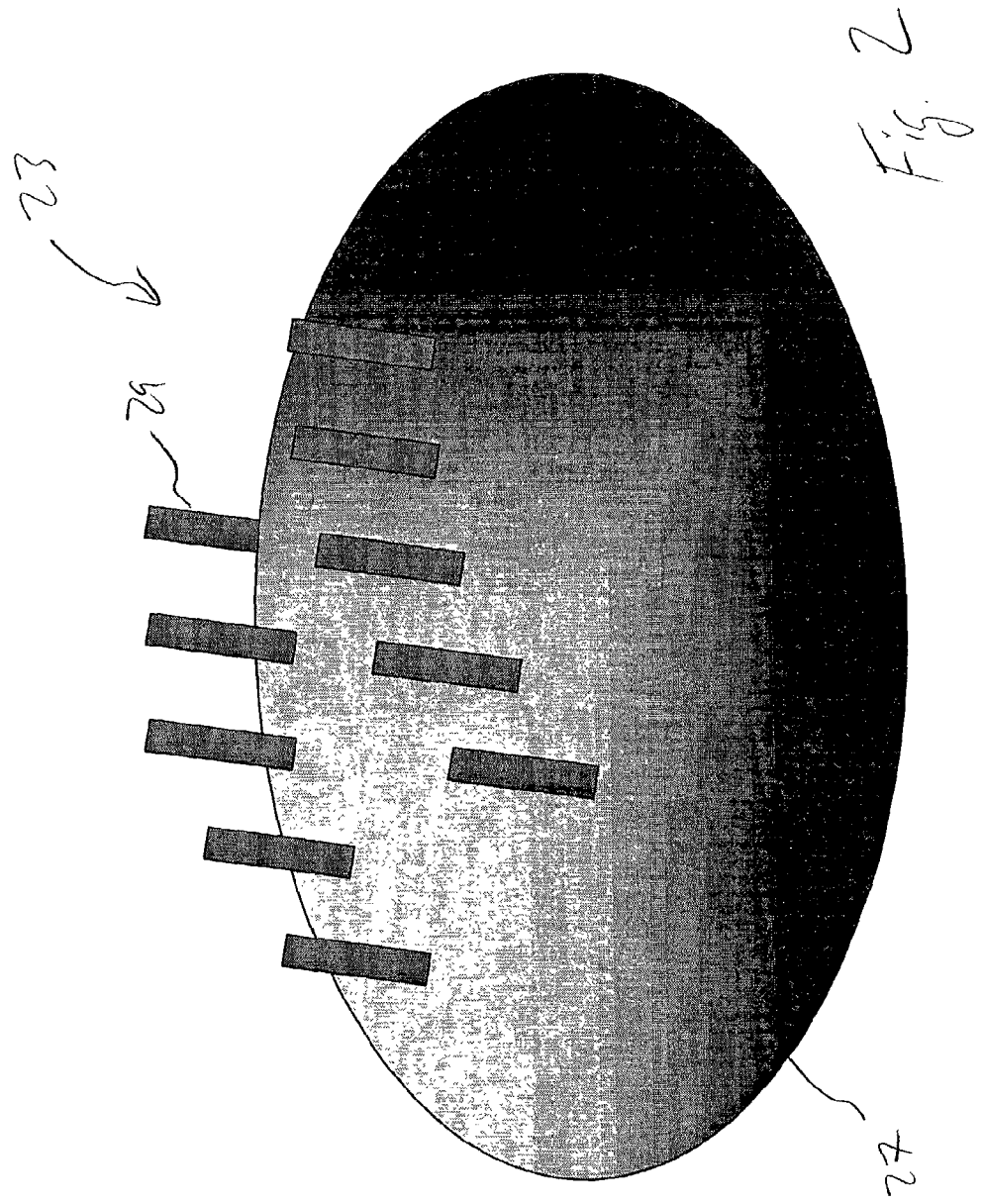

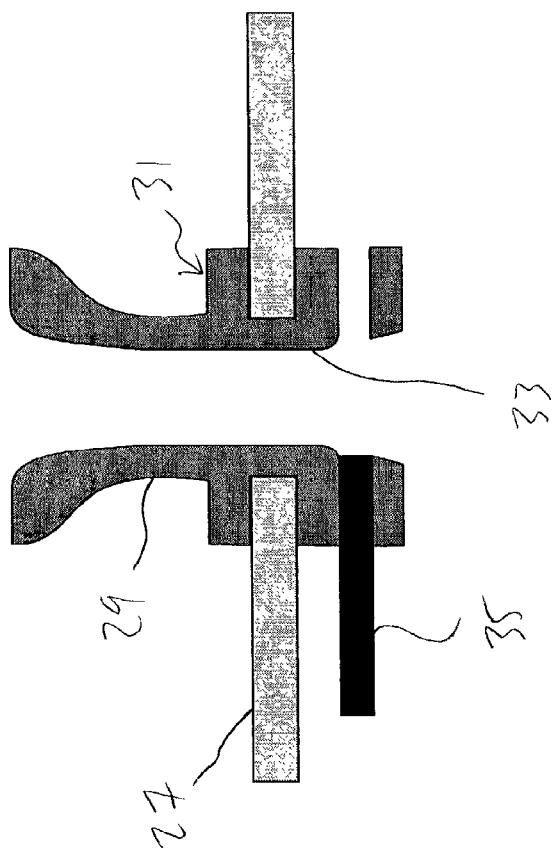
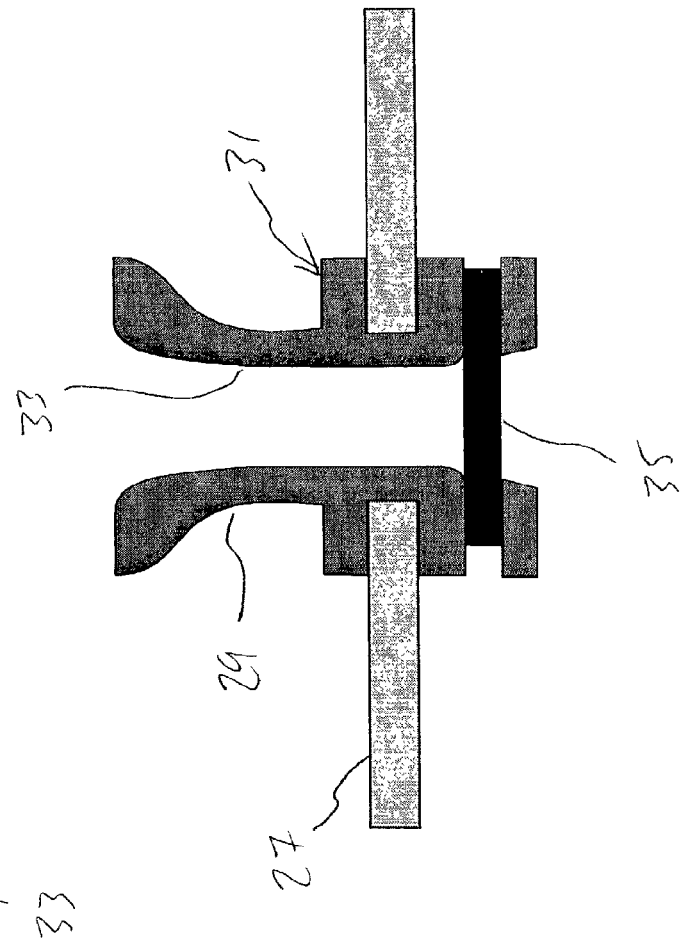

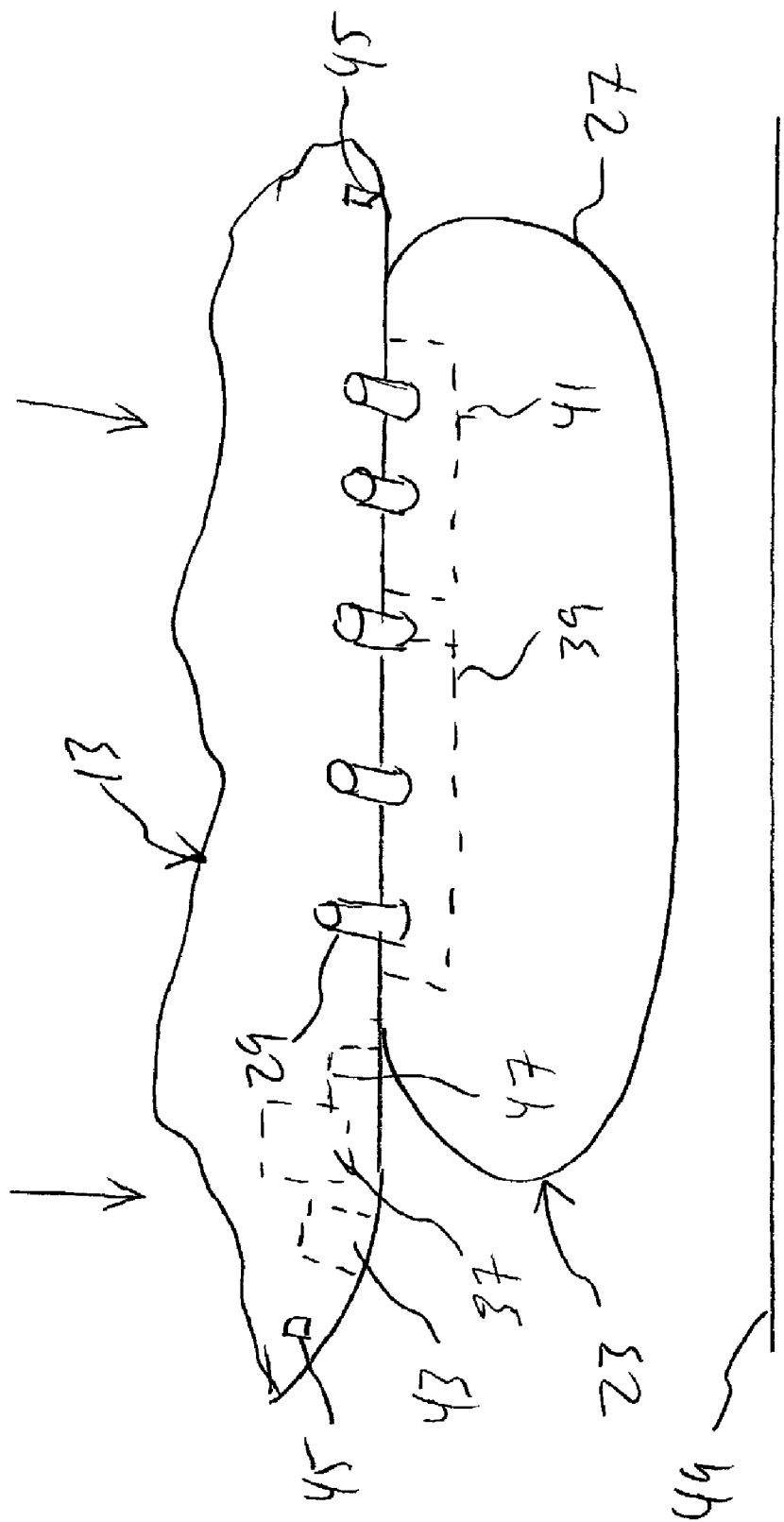

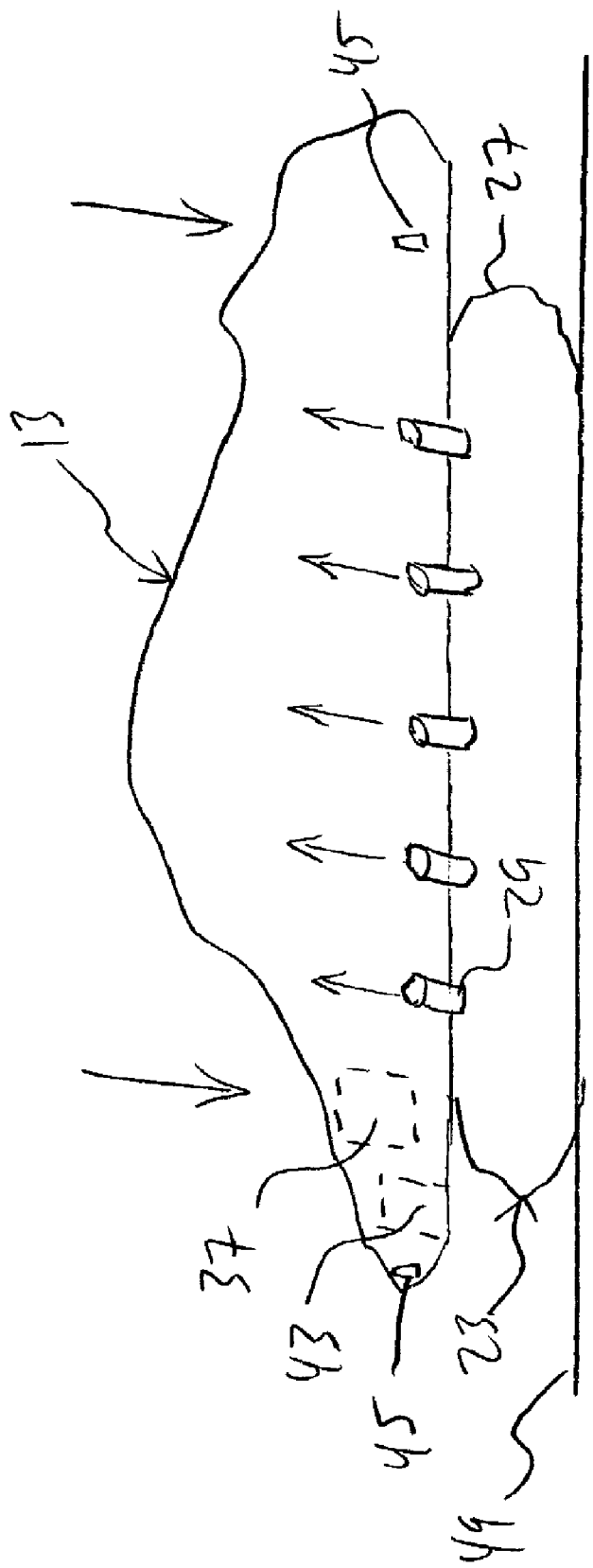

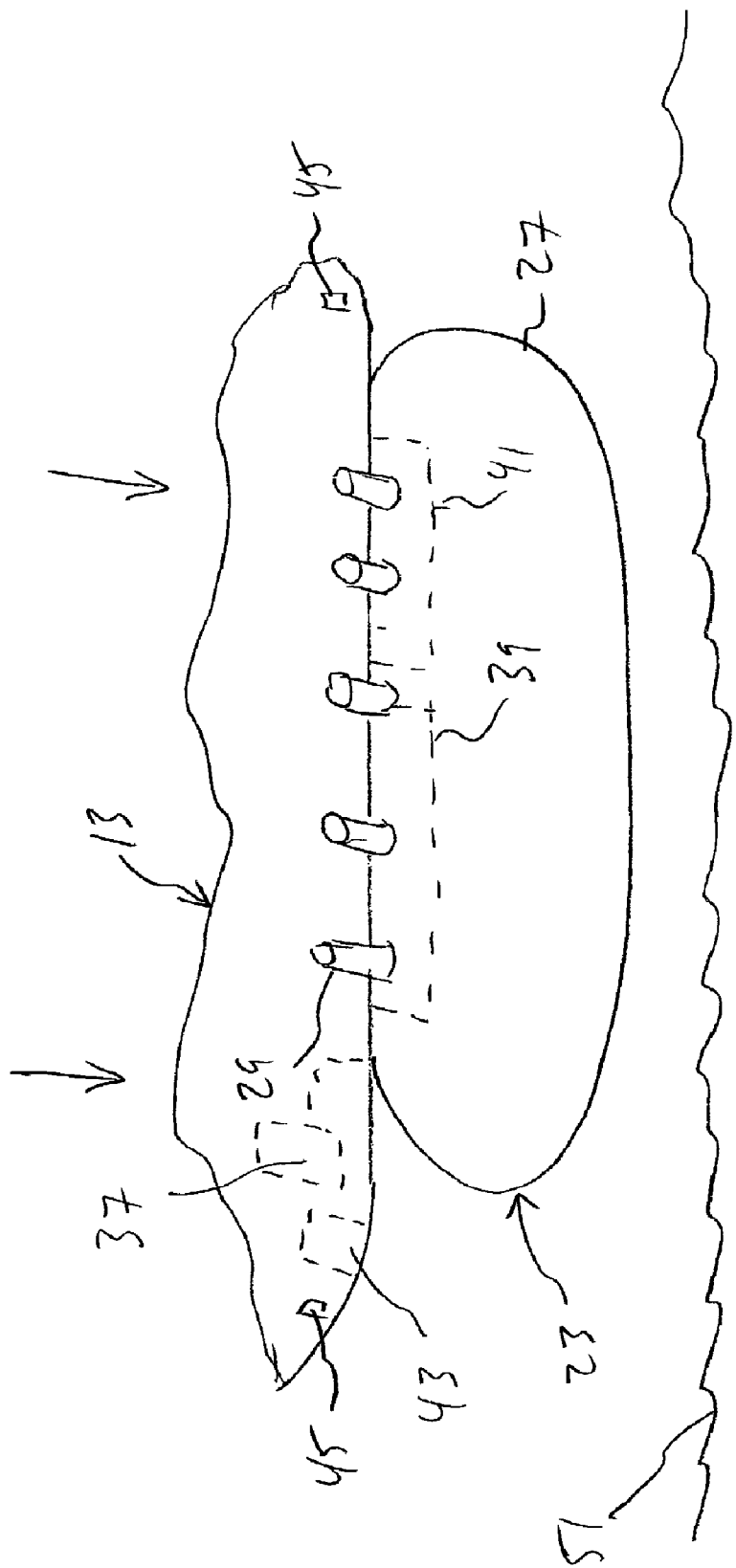

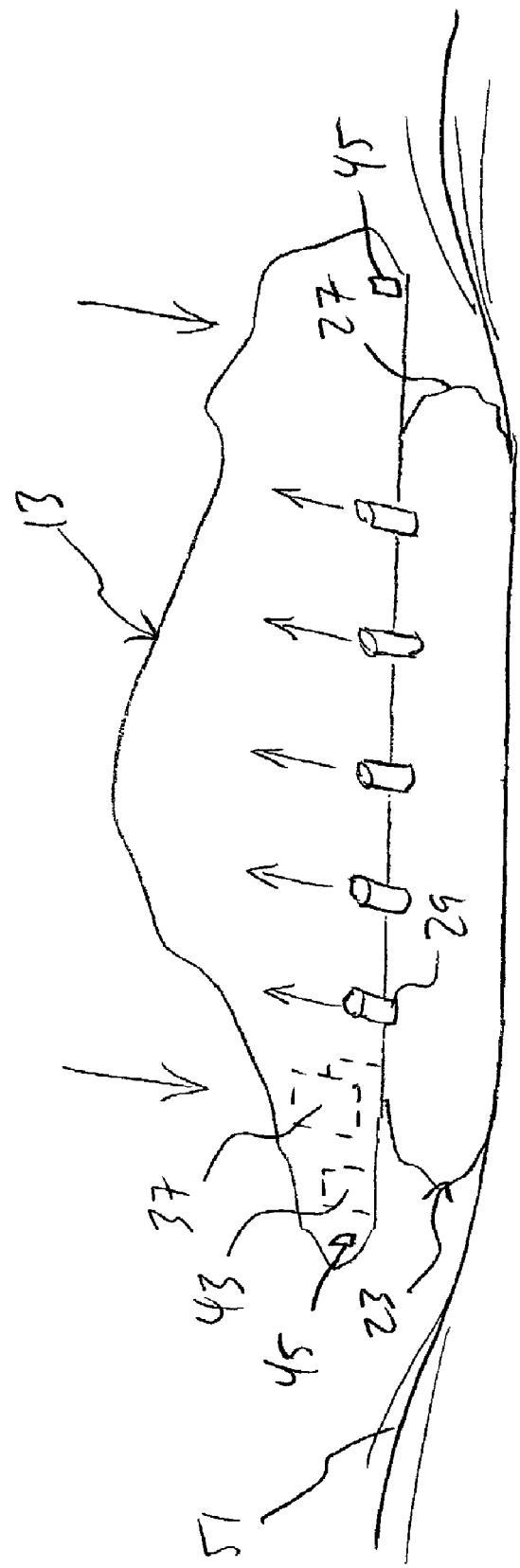

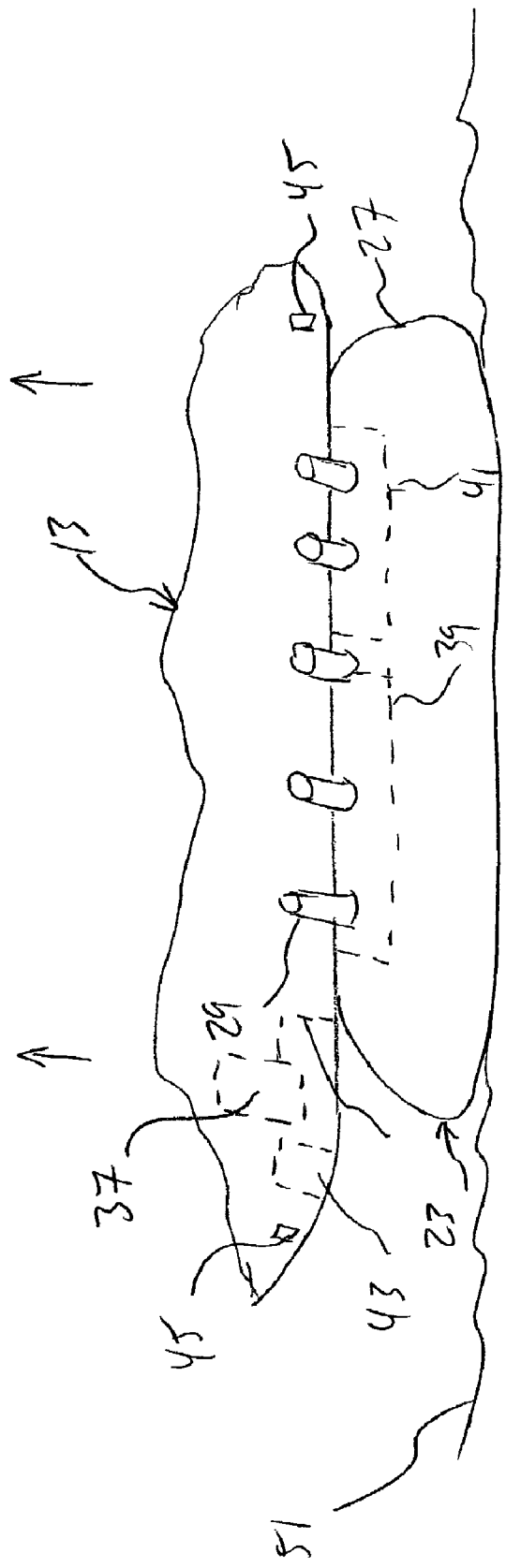

CRASH ATTENUATION SYSTEM FOR AIRCRAFT

TECHNICAL FIELD

The present invention relates generally to crash attenuation systems and specifically to crash attenuation systems for use in aircraft.

DESCRIPTION OF THE PRIOR ART

Currently internal airbags are used in the automotive industry within the occupied volume to mitigate occupant injuries. Similarly, external airbags have been used to attenuate decelerative loads to air and space vehicles, such as escape modules, upon contact with the ground or water. Examples include the NASA Mars Rovers and the crew module of the General Dynamics/Grumman F-111.

During impact, the gas in the airbag must be vented to prevent gas pressurization and subsequent re-expansion, which may cause the occupant to accelerate backward. This effect is commonly known as rebound. In addition, the gas may be vented to prevent over-pressurization, which can cause failure of the airbag. Venting may be accomplished, for example, through discrete vents or through a porous membrane that forms at least a portion of the skin of the airbag. Some types of airbags may also be used for flotation devices when a crash occurs in water.

Although great strides have been made in the area of aircraft flotation systems, many short comings remain.

SUMMARY OF THE INVENTION

There is a need for an airbag crash attenuation system for aircraft that includes automatic post-crash re-inflation in water, allowing for use of the airbag as a flotation device for the aircraft.

Therefore, it is an object of the present invention to provide an airbag crash attenuation system for aircraft that includes automatic post-crash re-inflation in water, allowing for use of the airbag as a flotation device for the aircraft.

A crash attenuation system for an aircraft, the system having an airbag carried by the aircraft and inflatable generally adjacent an exterior of the aircraft. The airbag has at least one vent for releasing gas from the interior of the airbag. A first gas generator is in fluid communication with the interior of the airbag for inflating the airbag with gas generated when the first gas generator is operated. A vent valve is provided for controlling a flow of gas through each vent, each vent valve being selectively configurable between an open state, in which gas can pass through the associated vent from the interior of the airbag, and a closed state, in which gas is retained within the interior of the airbag. A second gas generator is provided for at least partially re-inflating the airbag after venting of gas through the at least one vent.

The present invention provides the following advantages: (1) the combination of an inflatable crash attenuator system for crash load attenuation with a post-crash flotation system; (2) the use of non-porous airbag fabric with discrete venting nozzles that vent to the ambient outside of the occupied zone; (3) the venting nozzle may be an actively controlled valve to minimize variability due to ground weight-center of gravity (GW-CG) changes, impact velocities, impact surface compliance, and impact attitudes; and (4) the use of an automatic valve as the venting nozzle that automatically closes upon contact with water.

BRIEF DESCRIPTION OF THE DRAWINGS

For a more complete understanding of the present invention, including its features and advantages, reference is now made to the detailed description of the invention taken in conjunction with the accompanying drawings, in which.

DESCRIPTION OF THE PREFERRED EMBODIMENT

The present invention provides for an inflatable crash attenuation system for aircraft. The system comprises an airbag that is inflated prior to impact and vented during impact, but also includes the ability to re-inflate for use as a post-crash flotation device. The present invention may be used on all models of aircraft, for example, helicopter, fixed wing aircraft, and other aircraft, and in particular those that are rotorcraft. The system of the invention improves on the prior art by providing automatic control of the venting valves and providing for post-crash re-inflation. The system of the invention may actually reduce the loads in an airframe structure needed to support large mass components (such as an engine and/or transmission), allowing for construction of lighter-weight airframe structures, which can offset the additional weight of the crash attenuation system.

Figure 1:
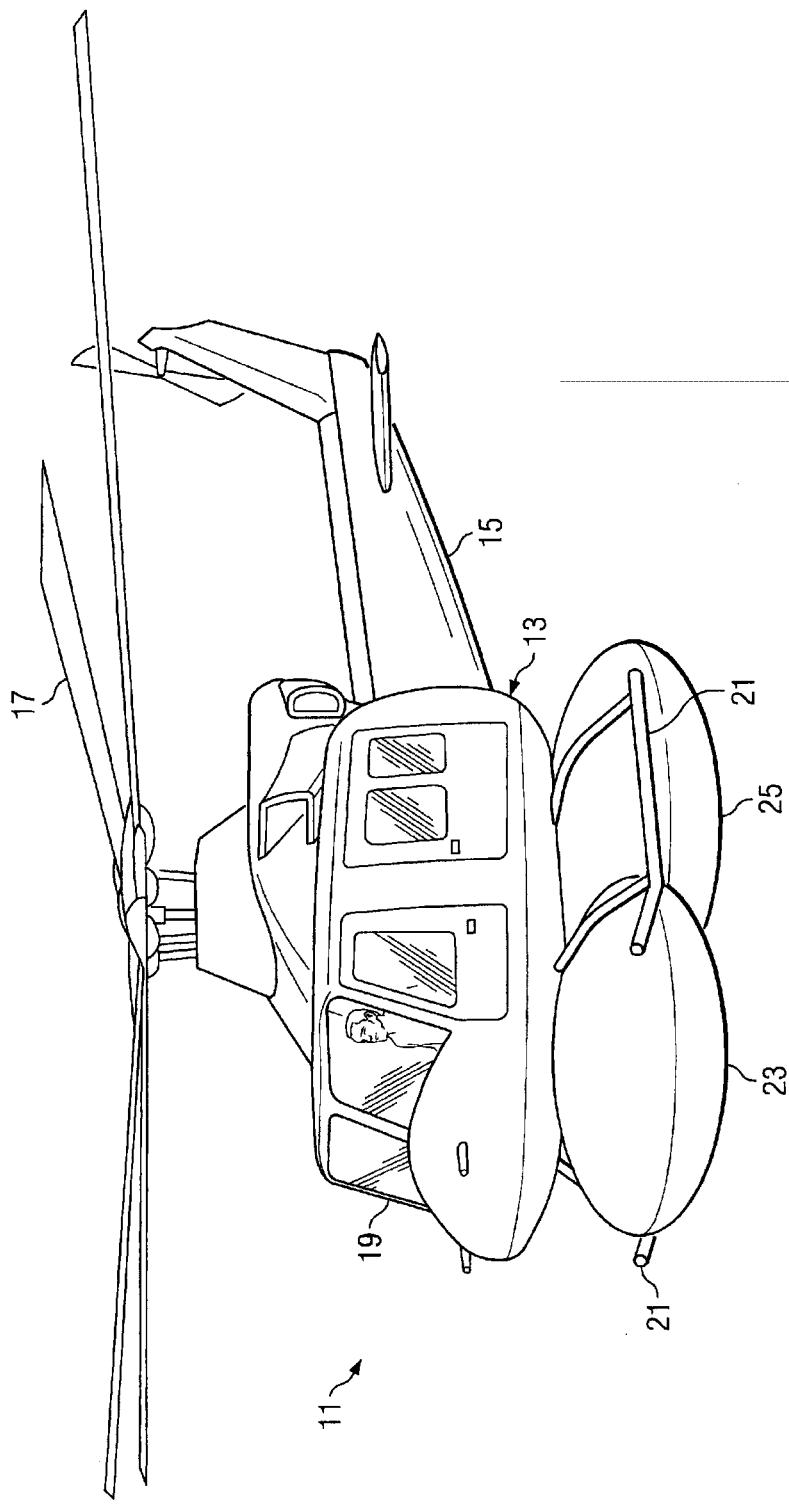
FIG. 1 is an oblique view of an aircraft incorporating a crash attenuation system according to the present invention.

FIG. 1 shows a helicopter 11 incorporating the crash attenuation system according to the present invention. Helicopter 11 comprises a fuselage 13 and a tail boom 15. A rotor 17 provides lift and propulsive forces for flight of helicopter 11. A pilot sits in a cockpit 19 in a forward portion of fuselage 13, and a landing skid 21 extends from a lower portion of fuselage 13 for supporting helicopter 11 on a rigid surface, such as the ground.

A problem with rotor 17 or the drive system for rotor 17 may necessitate a descent from altitude at a higher rate of speed than is desirable. If the rate is an excessively high value at impact with the ground or water, the occupants of helicopter 11 may be injured and helicopter 11 may be severely damaged by the decelerative forces exerted on helicopter 11. To reduce these forces, inflatable, non-porous airbags 23, 25 are installed under fuselage 13. Though not shown in the drawings, airbags 23, 25 are stored in an uninflated condition and are inflated under the control of a crash attenuation control system (described below).

Figure 2:
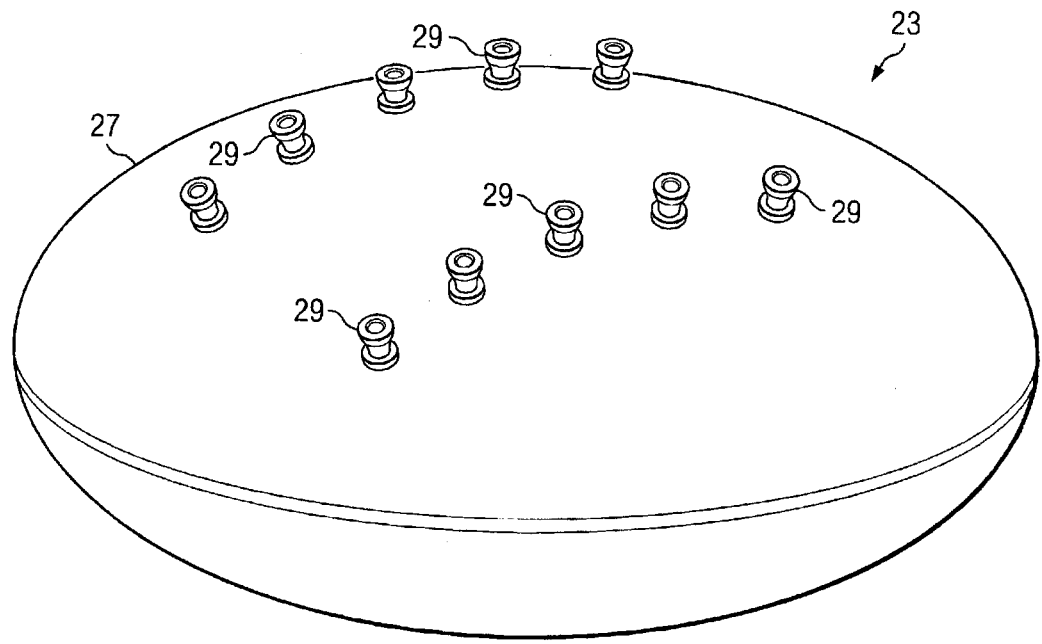
FIG. 2 is an enlarged, oblique view of an airbag portion of the crash attenuation system of FIG. 1.

FIG. 2 is an enlarged view of airbag 23, which has a non-porous bladder 27 and a plurality of discrete vents 29.

Airbag 23 is shown in the figure, but it should be noted that airbags 23, 25 have generally identical configurations. Vents 29 communicate the interior of bladder 27, allowing for gas within airbag 23 to be vented. In the embodiment shown, vents 29 are open to the ambient air, though vents may be connected to a closed volume, such as another airbag or an accumulator (not shown).

Figure 3:
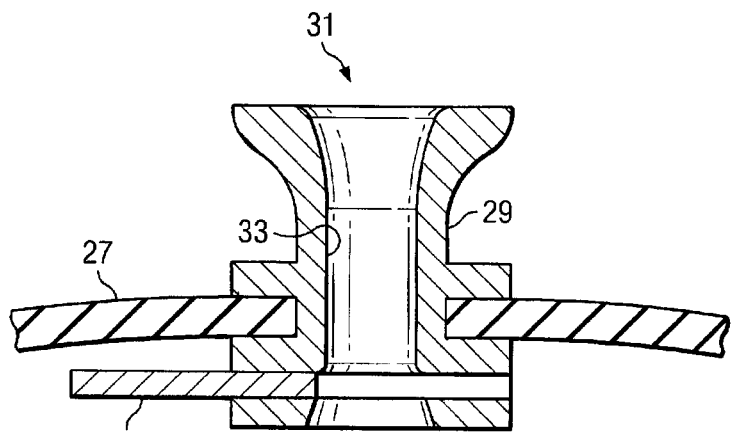
FIG. 3 is a cross-section view of a valve portion of the airbag of FIG. 2, the valve being shown in an open configuration.
Figure 4:
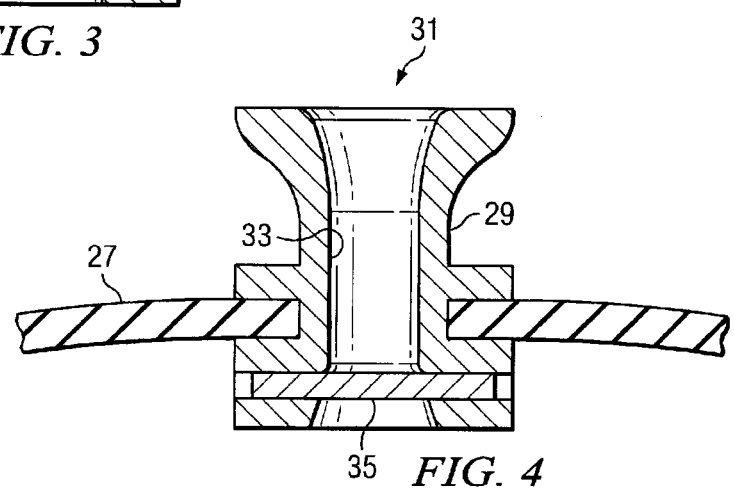
FIG. 4 is a cross-section view of a valve portion of the airbag of FIG. 2, the valve being shown in a closed configuration.

Referring to FIGS. 3 and 4, each vent 29 has a vent valve 31 for controlling the flow of gas through vent 29. Vent 29 and vent valve 31 together form a vent passage 33 for channeling gas flowing out of airbag 23. Each vent valve 31 is sealingly mounted in bladder 27 to prevent the leakage of gas around vent 31, which forces venting gas to flow through passage 33. A vent plate 35 is configured to be moveable between an open position and a closed position. FIG. 3 shows vent plate 35 in the open position, or open state, in which gas is allowed to flow through passage 33 from within bladder 27. FIG. 4 shows vent plate 35 in the closed position, or closed state, in which gas is prevented from flowing out of bladder 27 into passage 33. Though shown as a sliding valve, it will be understood by one skilled in the art that vent valves 31 may alternatively be other suitable types of valves. Control of vent valves 31 may be accomplished though any number of means, including, for example, electrorheological means.

FIGS. 5 through 9 show airbag 23 mounted to a lower portion of fuselage 13 and show additional components of the crash attenuation system according to the present invention. A computer-based control system 37, which is shown mounted within fuselage 13, is provided for controlling the operation of components associated with airbags 23, 25. Each airbag 23, 25 has a first gas source, such as gas generator 39, for initial inflation of the associated airbag 23, 25 and a secondary gas source, such as compressed gas tank 41, for post-crash re-inflation of airbag 23, 25. Each gas source may be of various types, such as gas-generating chemical devices or compressed air, for providing gas for inflating airbags 23, 25. In addition, the system of the invention preferably has at least one sensor 43 for detecting rate of descent and/or ground proximity. Airbags 23, 25 also preferably have a water-detection system, which may have sensors 45 mounted on fuselage 13 for detecting a crash in water. Gas generator 39, compressed gas tank 41, vent valves 31, and sensors 43, 45 are connected to control system 37 through data and/or power cables 47, allowing control system 37 to communicate with, monitor, and control the operation of these attached components. In addition, control system 37 may be connected to a flight computer or other system for allowing the pilot to control operation of the crash attenuation system. For example, the pilot may be provided means to disarm the system of the invention when the aircraft has safely landed.

Figure 5:
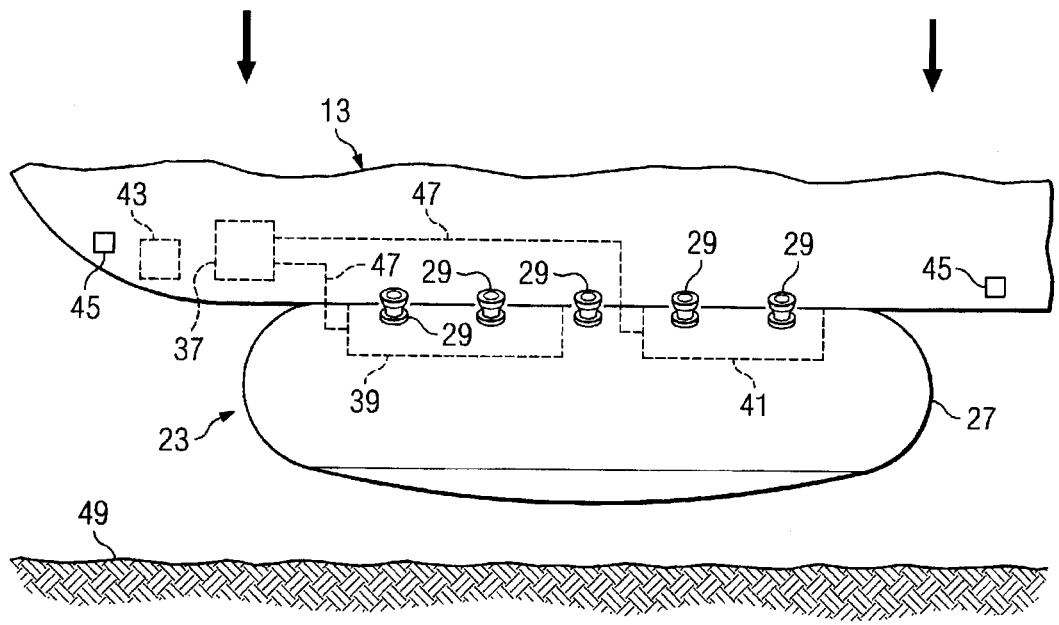
FIG. 5 is a side view of a portion of the helicopter of FIG. 1 prior to a crash on land.
Figure 6:
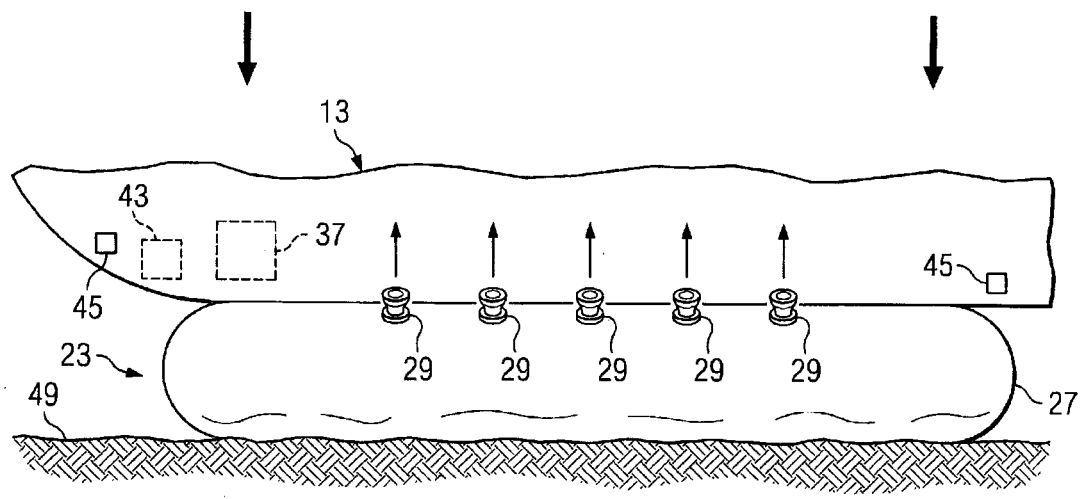
FIG. 6 is a side view of a portion of the helicopter of FIG. 1 subsequent to a crash on land.
Figure 7:
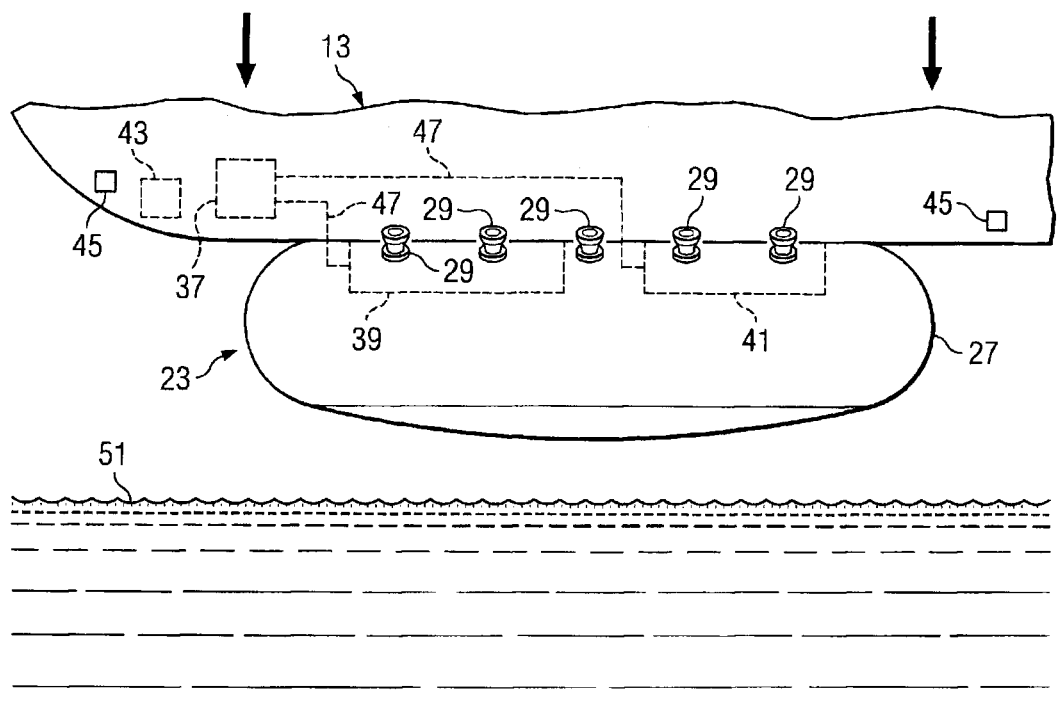
FIG. 7 is a side view of a portion of the helicopter of FIG. 1 prior to a crash on water.
Figure 9:
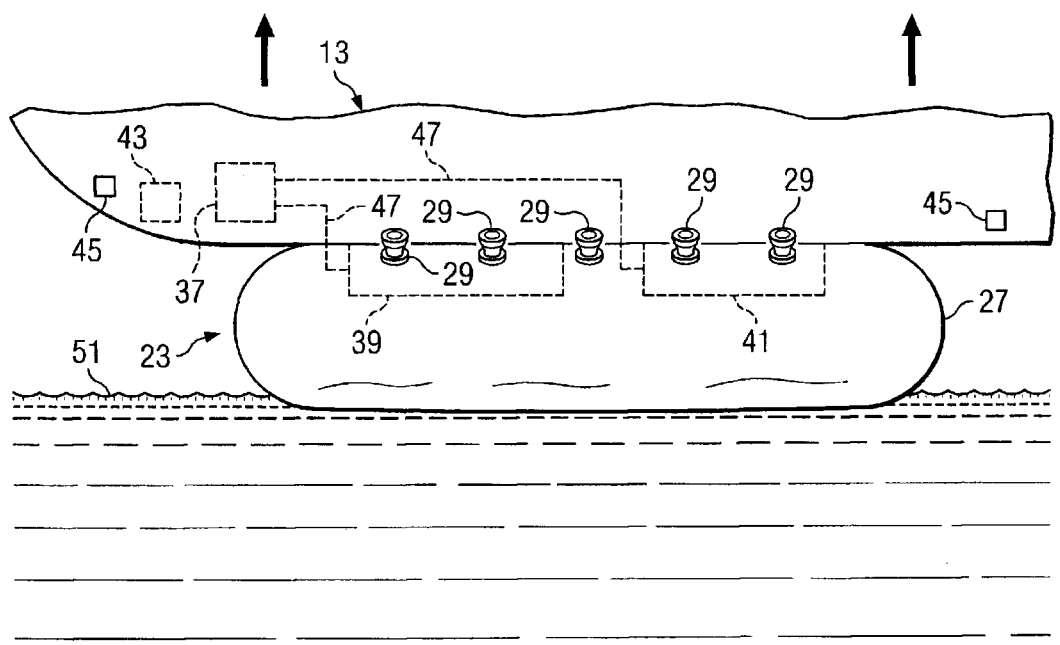
FIG. 9 is a side view of a portion of the helicopter of FIG. 1 subsequent to a crash on water and after re-inflation of the airbag.
Figure 8:
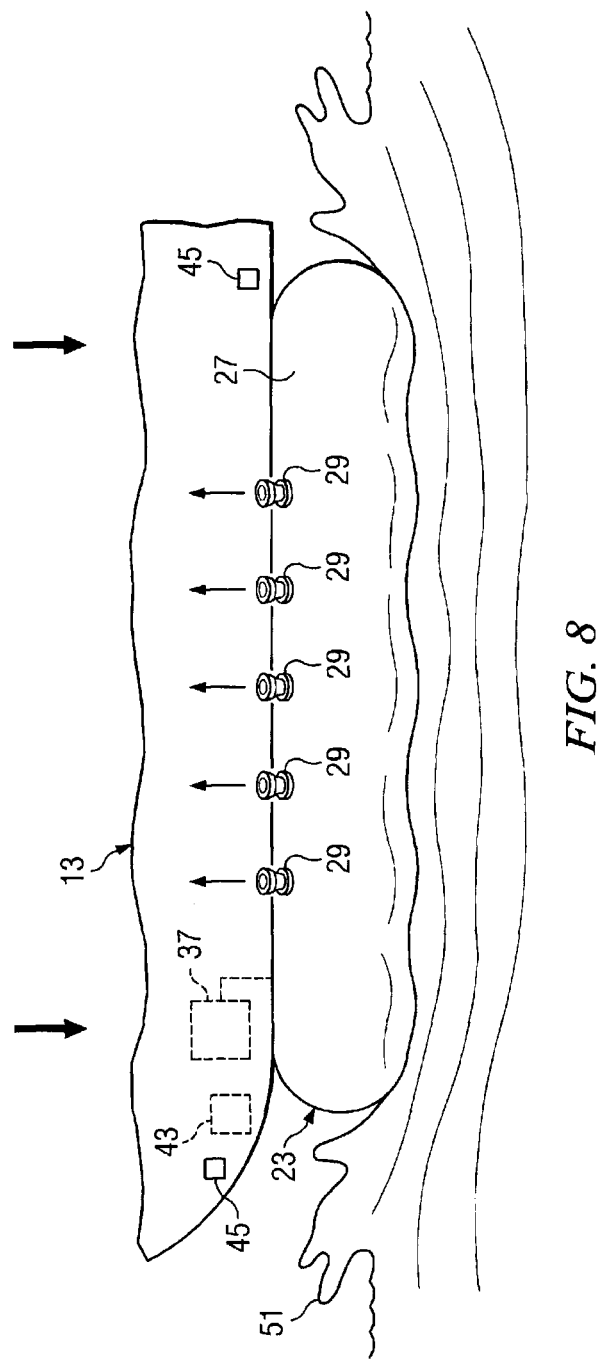
FIG. 8 is a side view of a portion of the helicopter of FIG. 1 subsequent to a crash on water.

FIGS. 5 through 9 illustrate operation of the crash attenuation system, with FIGS. 5 and 6 showing use during a crash onto a rigid surface, such as the ground, and FIGS. 7 through 9 showing use during a crash into water. Only airbag 23 is shown, though the operation of airbag 25 is identical to that of airbag 23.

In operation, if an impending crash is sensed by sensor 43, for example, by excessive oncoming rate of the ground within a certain attitude range, control system 37 triggers primary gas generators 39 to inflate airbags 23, 25 at the appropriate time to allow full inflation just as airbags 23, 25 contact the impact surface (ground or water).

FIG. 5 shows an impending crash onto ground 49. Primary gas generator 39 has already been triggered, and bladder 27 of airbag 23 is inflated just prior to contact with ground 49. FIG. 6 shows the effect on airbag 23 during the impact, in which gas in bladder 27 is vented through vents 29 to dissipate the gas pressure for minimizing the structural loading in fuselage 13 due to the crash. To allow for gas to escape through vents 29, vent valves 31 (described above) are commanded by control system 37 to switch from being closed to being at least partially open. The amount by which vent valves 31 are opened at impact will be determined by control system 37 based upon selected factors, which may include, for example, the rate of descent and the weight of the aircraft.

FIG. 7 shows an impending crash onto water 51. Primary gas generator 39 has already been triggered, and bladder 27 of airbag 23 is inflated just prior to contact with water 51. FIG. 8 shows the effect on airbag 23 during the impact, in which gas in bladder 27 is vented through vents 29 to dissipate the gas pressure for minimizing the structural loading in fuselage 13 due to the crash. To allow for gas to escape through vents 29, vent valves 31 (described above) are commanded by control system 37 to switch from being closed to being at least partially open. If water-detection sensors 45 detect water, control system 37 commands vent valves 31 to close and then commands compressed gas tank 41 to release gas into bladder 27 to at least partially re-inflate airbag 23. This allows airbags 23, 25 to release most or all of the gas provided by primary gas generator 39 during the crash and also act as post-crash flotation devices, providing buoyancy to helicopter 11. The use of compressed gas allows for faster re-inflation, which is important to prevent further submersion of the aircraft.

It should be noted that having airbags 23, 25 deploy in central positions beneath an aircraft may lead to instability in water, wherein the aircraft may be top-heavy and lean or turn over in water. Additional buoyant devices, such as airbags, may be used to prevent upset of the aircraft by spacing them from airbags 23, 25. For example, outrigger airbags may be deployed on landing skid 21 on helicopter 11.

While this invention has been described with reference to at least one illustrative embodiment, this description is not intended to be construed in a limiting sense. Various modifications and combinations of the illustrative embodiments, as well as other embodiments of the invention, will be apparent to persons skilled in the art upon reference to the description.

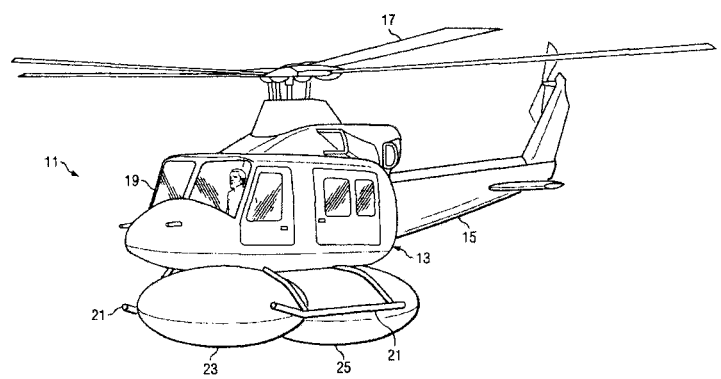

The invention claimed is:

1. A crash attenuation system for an aircraft, the system comprising:
    an airbag carried by the aircraft and inflatable to a position exterior of the aircraft, the airbag having at least one vent for releasing gas from the interior of the airbag for crash attenuation;
    a first gas source in fluid communication with the interior of the airbag for inflating the airbag to the position exterior of the aircraft with gas provided by the first gas source;
    a vent valve for controlling a flow of gas through each of the at least one vent, each vent valve being selectively configurable between an open state, in which gas can pass through the associated vent from the interior of the airbag, and a closed state, in which gas is retained within the interior of the airbag; and
    a second gas source in fluid communication with the interior of the airbag for at least partially re-inflating the airbag with gas provided by the second gas source after venting of gas through the at least one vent.

2. The crash attenuation system according to claim 1, wherein the first gas source is a gas generator.

3. The crash attenuation system according to claim 1, wherein the second gas source comprises compressed gas.

4. The crash attenuation system according to claim 1, further comprising:
    a water-detection system for detecting the presence of water.

5. The crash attenuation system according to claim 1, further comprising:
a water-detection system for detecting the presence of water;
wherein when the water-detection system detects water, each vent valve is switched to the closed state, and the second gas source is used to at least partially re-inflate the airbag.

6. A crash attenuation system for an aircraft, the system comprising:
an airbag carried by the aircraft and inflatable to a position exterior of the aircraft, the airbag having at least one vent for releasing gas from the interior of the airbag for crash attenuation;
a first gas source in fluid communication with the interior of the airbag for inflating the airbag to the position exterior of the aircraft with gas provided by the first gas source;
a vent valve for controlling a flow of gas through each of the at least one vent, each vent valve being selectively configurable between an open state, in which gas can pass through the associated vent from the interior of the airbag, and a closed state, in which gas is retained within the interior of the airbag;
a second gas source in fluid communication with the interior of the airbag for at least partially re-inflating the airbag with gas provided by the second gas source after venting of gas through the at least one vent; and
a water-detection system for detecting the presence of water.

7. The crash attenuation system according to claim 6, wherein the first gas source is a gas generator.

8. The crash attenuation system according to claim 6, further comprising:
wherein the second gas source comprises compressed gas.

9. The crash attenuation system according to claim 6, further comprising:
wherein when the water-detection system detects water, each vent valve is switched to the closed state, and the second gas source is used to at least partially re-inflate the airbag.

* * * * *

UNITED STATES PATENT AND TRADEMARK OFFICE
CERTIFICATE OF CORRECTION

PATENT NO. : 7,954,752 B2  Page 1 of 7
APPLICATION NO. : 12/089884
DATED : June 7, 2011
INVENTOR(S) : Smith et al.

It is certified that error appears in the above-identified patent and that said Letters Patent is hereby corrected as shown below:

The title page showing an illustrative figure should be deleted and substitute therefor the attached title page.

Title Page, Item (75) Inventors: correct the spelling of "Arlingotn" to --Arlington--.

Title Page, please add the following Item to the patent: --(60) Provisional application No. 60/735,077, filed on Nov. 9, 2005.--

Delete Drawing Sheets 1-8 and substitute therefor the Drawing Sheets consisting of Figs 1-9 as shown on the attached pages.

Signed and Sealed this
Twenty-seventh Day of March, 2012

David J. Kappos
*Director of the United States Patent and Trademark Office*

(12) United States Patent
Smith et al.

(10) Patent No.: US 7,954,752 B2
(45) Date of Patent: Jun. 7, 2011

(54) CRASH ATTENUATION SYSTEM FOR AIRCRAFT

(75) Inventors: Michael R. Smith, Colleyville, TX (US); Somen Chowdhury, Kirkland (CA); Cheng-Ho Tho, Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 436 days.

(21) Appl. No.: 12/089,884

(22) PCT Filed: Nov. 8, 2006

(86) PCT No.: PCT/US2006/043706
§ 371 (c)(1),
(2), (4) Date: Apr. 10, 2008

(87) PCT Pub. No.: WO2008/054401
PCT Pub. Date: May 8, 2008

(65) Prior Publication Data
US 2010/0044507 A1  Feb. 25, 2010

(60) Provisional application No. 60/735,077, filed on Nov. 9, 2005.

(51) Int. Cl.
*B64C 25/56* (2006.01)
*B64D 25/18* (2006.01)

(52) U.S. Cl. .............. 244/17.17; 244/100 A; 244/107; 244/139

(58) Field of Classification Search ........... 244/17.17, 244/139, 121, 100 A, 107; 441/125
See application file for complete search history.

(56) References Cited

U.S. PATENT DOCUMENTS

| | | | | |
|---|---|---|---|---|
| 2,131,528 A | * | 9/1938 | Soyer | 244/107 |
| 3,602,661 A | * | 8/1971 | Lindberg | 200/61.05 |
| 3,603,535 A | * | 9/1971 | DePolo | 244/121 |
| 3,727,716 A | * | 4/1973 | Jenkins | 244/100 A |
| 3,738,597 A | * | 6/1973 | Earl et al. | 244/100 A |
| 3,964,698 A | * | 6/1976 | Earl | 244/100 A |
| 3,981,462 A | * | 9/1976 | Berezhnoi et al. | 244/100 A |

(Continued)

FOREIGN PATENT DOCUMENTS
DE   4118300 A1   12/1992
(Continued)

OTHER PUBLICATIONS

"CABS Cockpit Air Bag System," Armor Holdings Aerospace & Defense Group, Jan. 2006.
Akif Bolukbasi, "Active Crash Protection Systems for UAVs," American Helicopter Society Annual Forum 63 Proceedings, Virginia Beach, VA, May 1-3, 2007.

(Continued)

*Primary Examiner* — Galen Barefoot
(74) *Attorney, Agent, or Firm* — James E. Walton

(57) ABSTRACT

A crash attenuation system for an aircraft, the system having an airbag carried by the aircraft and inflatable generally adjacent an exterior of the aircraft. The airbag has at least one vent for releasing gas from the interior of the airbag. A first gas source is in fluid communication with the interior of the airbag for inflating the airbag with gas generated provided by the first gas source. A vent valve is provided for controlling a flow of gas through each vent, each vent valve being selectively configurable between an open state, in which gas can pass through the associated vent from the interior of the airbag, and a closed state, in which gas is retained within the interior of the airbag. A second gas source is provided for at least partially re-inflating the airbag after venting of gas through the at least one vent.

9 Claims, 5 Drawing Sheets